(12) United States Patent
Hampp-Bahnmueller et al.

(10) Patent No.: US 12,417,306 B2
(45) Date of Patent: Sep. 16, 2025

(54) SMART IDENTIFICATION OF INDICATOR TEXT WITH FULL-TEXT SEARCH OR OPTIMIZED DOCUMENT ANALYSIS

(71) Applicant: International Business Machines Corporation, Armonk, NY (US)

(72) Inventors: Thomas Hampp-Bahnmueller, Stuttgart (DE); Michael Baessler, Bempflingen (DE); Yannick Saillet, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 18/068,022

(22) Filed: Dec. 19, 2022

(65) Prior Publication Data

US 2024/0202358 A1    Jun. 20, 2024

(51) Int. Cl.
*G06F 21/62* (2013.01)
*G06F 16/31* (2019.01)
*G06F 16/332* (2025.01)

(52) U.S. Cl.
CPC .......... *G06F 21/6245* (2013.01); *G06F 16/31* (2019.01); *G06F 16/3325* (2019.01)

(58) Field of Classification Search
CPC ... G06F 21/6245; G06F 16/3325; G06F 16/31
See application file for complete search history.

(56) References Cited

U.S. PATENT DOCUMENTS 7,617,197 B2 * 11/2009 Stanton ............... G06F 16/31
8,799,287 B1    8/2014 Barile
9,971,809 B1    5/2018 Tarsi
10,997,233 B2 *  5/2021 He .................. G06N 3/045
11,188,657 B2  11/2021 Jean-Louis
(Continued)

FOREIGN PATENT DOCUMENTS

CN    106777140 B      5/2017
CN    115146070 A  * 10/2022 ............ G06F 16/36
EP    3640847 A1      4/2020

OTHER PUBLICATIONS

Authors et al.: Disclosed Anonymously, "Precise Extraction of Weakly Specific Concepts Through Learning Distinctive Contexts Using Hidden Markov Models", An IP.com Prior Art Database Technical Disclosure, IP.com No. IPCOM000266563D, IP.com Electronic Publication Date: Jul. 29, 2021, 5 Pages.

*Primary Examiner* — Frantz B Jean
(74) *Attorney, Agent, or Firm* — Joseph P. Curcuru

(57) ABSTRACT

Several aspects for optimizing unstructured document analysis comprise operating a document system, where the document system comprises a plurality of documents comprising unstructured content and a full-text index; receiving a request to identify documents comprising a type of data elements; selecting a sample out of the plurality of documents; determining data elements of the type in the sample of documents; determining an indicator context expression for the type of data elements out of the determined data elements of the type; determining a query for searching, using a search engine, the full-text index using the indicator context expression; and determining the documents in the document system being compliant to the determined query.

20 Claims, 5 Drawing Sheets

(56) References Cited

U.S. PATENT DOCUMENTS

| | | | | |
|---|---|---|---|---|
| 2014/0258330 | A1* | 9/2014 | Cheng | G06F 16/90335 |
| | | | | 707/771 |
| 2015/0286747 | A1* | 10/2015 | Anastasakos | G06F 16/9535 |
| | | | | 707/776 |
| 2017/0228372 | A1* | 8/2017 | Moreno | G06F 16/24522 |
| 2019/0354604 | A1* | 11/2019 | Filonov | G06F 16/90324 |
| 2021/0295436 | A1* | 9/2021 | Langdon, Jr. | G06F 16/24564 |
| 2024/0006080 | A1* | 1/2024 | Molero Leon | G16B 20/40 |
| 2024/0386015 | A1* | 11/2024 | Crabtree | G06F 16/9024 |

* cited by examiner

SMART IDENTIFICATION OF INDICATOR TEXT WITH FULL-TEXT SEARCH OR OPTIMIZED DOCUMENT ANALYSIS

BACKGROUND

The invention relates generally to a method for analyzing unstructured documents, and more specifically, to a method for optimizing unstructured document analysis, e.g., in respect to sensitive data. The invention relates further to a computer-implemented document analysis system for optimizing unstructured document analysis, and a related computer program product.

The amount of data managed by enterprise IT (information technology) departments is growing faster than ever. Additionally, the amount of so-called unstructured or semi-structured—e.g., text—data is growing disproportionally. However, data may only unfold its full potential and add a business value if the content can be made available in an automated way to business or technical processes, e.g., for controlling automated production or supply chain processes.

Moreover, tighter regulatory constraints also require analyzing available documents in document repositories in order to guarantee privacy at a required level and identify documents and/or contents that may violate governmental rules, like GDPR (EU General Data Privacy Regulation). However, identifying sensitive data in data repositories can be a difficult and—in any case—a computational expensive task. Therefore, a variety of business tasks may require deeper—hence more expensive—data analysis of unstructured data. Examples may be found in the area of an identification of policy violations for sensitive data classification or document analysis for eDiscovery audits.

In these use cases, the majority of documents is typically not relevant/responsive for the identification task and the deeper analysis will not find anything of interest and may classify the majority of the documents as irrelevant. On the other side, state-of-the-art processing would still require examining each and every document, executing the highly complex analysis task, and potentially consuming significant time and resources. Therefore, there is a need to optimize the identification of sensitive—or otherwise characteristic—data in large document repositories. Such systems may also be deployed in cloud computing environments.

SUMMARY OF THE INVENTION

According to one aspect of the present invention, a method for optimizing unstructured document analysis is provided. The method comprises operating a document system, where the document system comprises a plurality of documents comprising unstructured content and a related full-text index.

The method also comprises receiving a request to identify documents comprising a type of data elements, selecting a sample out of the plurality of documents, and determining all data elements of the type in the sample of documents.

Furthermore, the method comprises determining an indicator context expression for the type of data elements out of the determined data elements of the type, determining a query for searching, using a search engine, the full-text index using the indicator context expression, and determining all the documents in the document system being compliant to the determined query.

According to another aspect of the present invention, a computer-implemented document analysis system for optimizing unstructured document analysis is provided. The system comprises a processor and a memory operatively coupled to the processor, where the memory stored program code portions, which, when executed, enables the processor to operate a document system. Thereby, the document system comprises a plurality of documents comprising unstructured content and a related full-text index.

The processor is further enabled to receive a request to identify documents comprising a type of data elements, to select a sample out of the plurality of documents, and to determine all data elements of the type in the sample of the documents.

Additionally, the processor is enabled to determine an indicator context expression for the type of data elements out of all the determined data elements of the type, determine a query for searching, using a search engine, the full-text index using the indicator context expression, and determine all the documents in the document system being compliant to the determined query.

The proposed method for optimizing unstructured document analysis offers multiple advantages, technical effects, contributions and/or improvements:

The proposed inventive solution may be applicable in different technical and organizational fields. Foremost, privacy regulations may require a careful treatment of private and thus sensitive data. On request of the customer—and also in the other circumstances—private data relating to the customer may need to be deleted. The same applies to employment applications in HR departments. All of this may be GDPR-driven; however, also other privacy regulations in other territories may have comparable privacy rules.

On the other hand, the proposed solution may also be useful in other fields like medical research or genealogical research, just to name a few.

The underlying problem to be addressed may be the requirement for an analysis regarding sensitive data in a large repository—or other storage architectures—of text documents—or in general—documents with so-called unstructured content, i.e., unstructured or semi-structured documents. Analyzing such large amounts of documents—e.g., 1 million documents, 10 million documents or even more—may require a large amount of computational resources and time. In most cases, it may be ineffective to use a brute-force approach for analyzing all existing documents in the repository.

Hence, the proposed concept discloses to use a comparably small amount of documents of the repository, perform a full analysis regarding selected data elements—i.e., typically sensitive data—on these documents in order to extract an indicator context expression that is associated with the sensitive data and use these indicator context expressions as query input for a classical search engine. Such search engines are usually available anyway for document repositories as document management systems or content management systems.

As another aspect, the proposed concept allows for generalizing a query for a search engine based on data like a numeric insurance number or a street name to identify all documents with insurance numbers because they underlie a specific data pattern. However, such data pattern may be a format that is incompatible with input requirements for a search engine. In other words, a search engine would not be able to accept a query like "show me all street names". However, the proposed concept solves exactly such a problem.

Based on this, a large amount of documents—if compared to the originally selected ones—is retrieved from the document repository in order to execute a full analysis again.

However, this may deliver a "good enough result" and may render the analysis of the complete amount of data superfluous. Thus, using the proposed concept, the amount of computing resources to identify problematic sensitive data or otherwise selected data elements is significantly reduced. As an additional effect, also the time required to identify these documents is also dramatically reduced. Hence, to achieve the goal of identifying documents comprising sensitive data elements, computing resources and time are saved, which also support the concept of "green computing".

Furthermore, the proposed concept is compliant and executable in a cloud computing environment.

In the following, additional embodiments of the inventive concept—applicable for the method as well as for the system—will be described.

According to one useful embodiment of the method, the number of documents in the sample is significantly smaller—e.g., at least 10 times smaller—than the number of documents in the document system. As an example and without limiting the inventive concept: The sample may comprise about 1 per mille of the total amount of documents to be analyzed. Hence, if the complete document repository may hold 1 million documents then the sample may comprise only about 1000 documents. Additionally, in this example, a useful number of documents of all determined documents in the document system being compliant to the query by using the determined query may be in the range of about 10000 or similar, just to describe the kind of reduction of analysis effort required.

According to an advantageous embodiment of the method, the determining all the data elements of the type in the sample of the documents also comprises determining a number of relevant sample documents in the sample. Upon determining that the number of relevant sample documents is below a predefined sample threshold value, the method also comprises selecting a larger sample out of the plurality of the documents. It is understood that the number of relevant sample documents shall be large enough to comprise a minimum number of determinable data elements—i.e., a number of expressions, e.g., sensitive expressions or tokens—that is large enough for an expected useful result of the analysis. If it is determined that the number is too small, the method loops back and selects more documents from the underlying document repository. Thereby, different selection methods may be used. The selection of documents may be done randomly and according to the predefined algorithm.

According to another advantageous embodiment of the method, the determining all documents in the document system being compliant to the query by using the determined query also comprises applying a full analysis related to the determined compliant documents in the document system. This full analysis is based on identical methods as the initial analysis of the initially determined sample documents. Although it can be expected that the number of documents found being compliant to the query is larger than the number of documents of the sample, the number of documents found is also significantly smaller than the total number of documents in the complete repository. Thus, the analysis effort—and thus the computational costs—is significantly reduced.

According to another enhanced embodiment, the method also comprises determining a result number of all documents being compliant with the (determined) query, and if the result number being determined to be equal or outside predefined boundaries, the method comprises adjusting the query, and repeating the determining all documents in the document system being compliant to the query. In other words, the query for a search engine to search through the complete document repository is changed in that more options are given as part of the query—e.g., using an "or"—statement for another selected data element or expression or by other means—so that a large enough number of documents is retrieved for a full analysis.

According to another enhanced embodiment, the method also comprises: upon the result number having a value within predefined boundaries and a quality indicator value being larger than a predefined quality indicator threshold value, stopping the repeating. Thereby, the quality indicator is indicative of a quality criterion of the determined type of selected data element. Consequently, the result of the analysis should be "good enough" before terminating the analysis. For that, a sufficiently large number of documents should have been analyzed—but on the other side, not too many to stay within a computational resource budget—and predefined quality criteria shall be met.

According to one alternative further developed embodiment, the method also comprises—in particular, if the analysis could have been terminated—repeating the activities of 'determining an indicator context expression', 'determining the query for searching the full-text index', and 'determining all documents in the document system being compliant to the query', thereby redefining a scope of the indicator context expression. In other words, the method "would look" for more or less indicator context expression or simply other indicator context expression so as to re-adjust the analysis result, i.e., the method varies parameters for the determination of indicator context expression in order redefine the query for searching the full-text index.

In an embodiment, the document system is one selected out of the group comprising a document management system, a content management system, and enterprise content management system, a file system, a database or similar. Additionally, a large variety of formats in which the unstructured content is stored may be allowed, examples include txt-, csv-, XML-, html-, docx-, doc-, odt-formats, and others (txt=simple ASCII text; csv=comma separated variables; XML=extended markup language; and HTML=hypertext markup language).

According to a further advanced embodiment of the method, the determining the indicator context expression comprises selecting an expression left or upstream (in the text flow of the document) to a determined selected data element as one indicator context expression and/or selecting another expression right or downstream to the same determined data element as another indicator context expression. Thereby, it should be understood that expressions are separated by a predefined set of delimiters, e.g., a space character. Alternatives for delimiters comprise ones that indicate form labels like colon or tab and hints like capitalization or formatting and structural hints, like newline, indentation, bold formatting and table structure that indicate labels.

According to an additionally interesting embodiment of the method, the determining the indicator context expression also comprises selecting an expression as an indicator context expression in a surrounding of a determined selected data element—e.g., typically, before or left—wherein the expression has another format than other elements in the surrounding of the determined selected data element. In other words, hints in the form of a different formatting than the usual one are used to identify headers and other candidates for document level indicators.

According to a further developed embodiment of the method, the determining the indicator context expression comprises using a trained machine-learning model that has been trained to determine an indicator context expression for a determined selected data element in a given document. Thereby, the machine-learning model has been developed by a training of a machine-learning system with documents with labelled selected data elements and related indicator context expressions. This embodiment uses fuzzy search and depends significantly on the set of available training data. However, the better the training data set was, the better results of the document analysis can be expected.

According to a further permissive embodiment of the method, the determining the indicator context expressions comprises using an association model—i.e., an ex-apriori algorithm—adapted for detecting strong relationship patterns between determined data elements and a potential indicator context expression, and confirming the potential indicator context expression as an actual indicator context expression based on an analysis of other documents comprising the relationship of the potential indicator context expression and the determined (selected) data element. As an example of such predefined relationships the following statement may be considered: "IF token (or expression) is selected/sensitive then left token is X with 75% confidence". A variety of strong relationship pattern detection algorithms may be used to achieve this goal.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium is any apparatus that contains means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject—matter, also any combination between features relating to different subject—matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Figure 1:
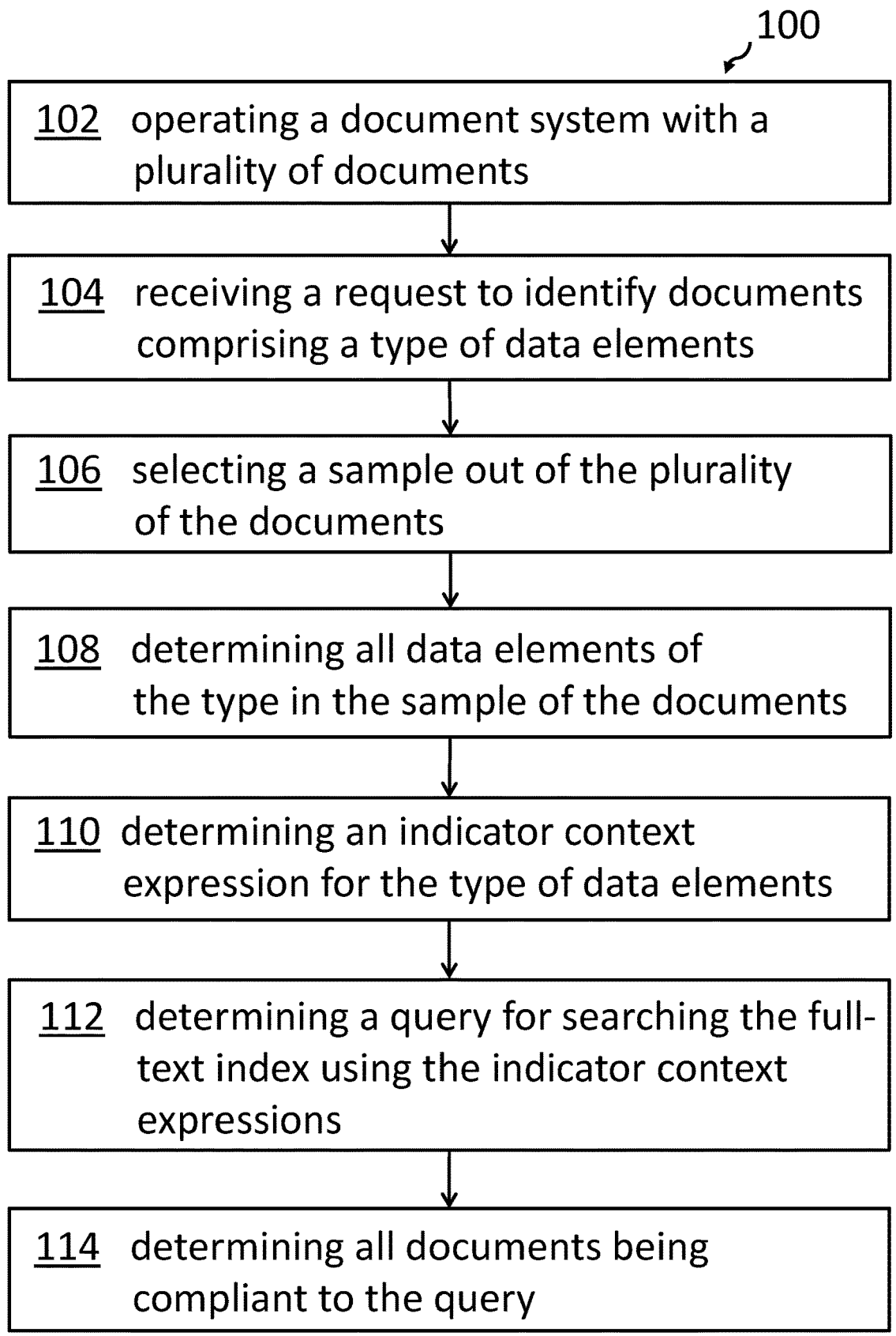

Preferred embodiments of the invention will be described, by way of example only, and with reference to the following drawings:

FIG. 1 shows a block diagram of an embodiment of the inventive method for optimizing unstructured document analysis.

Figure 2:
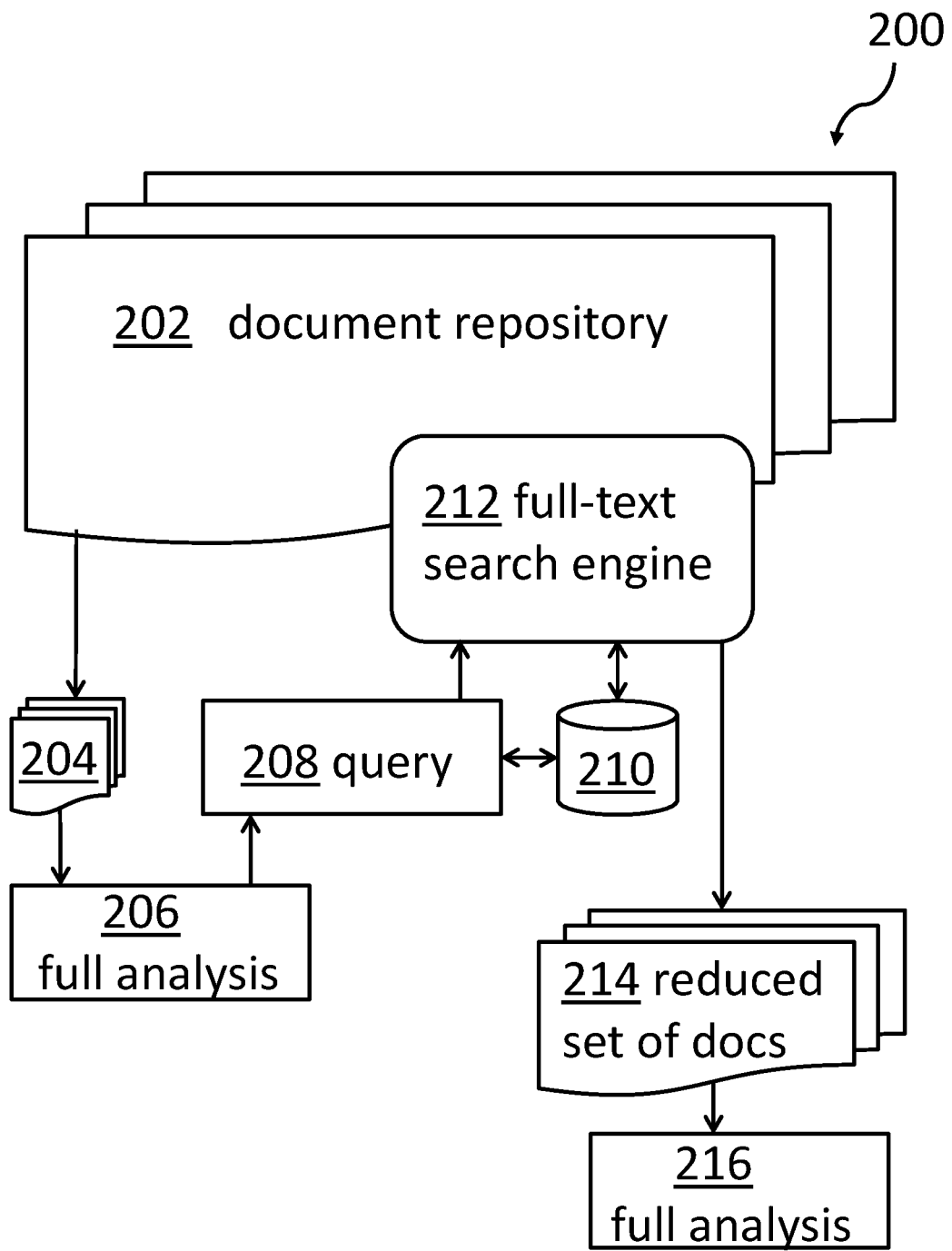

FIG. 2 shows a sort of architecture block diagram of an embodiment of the present invention.

Figure 3:
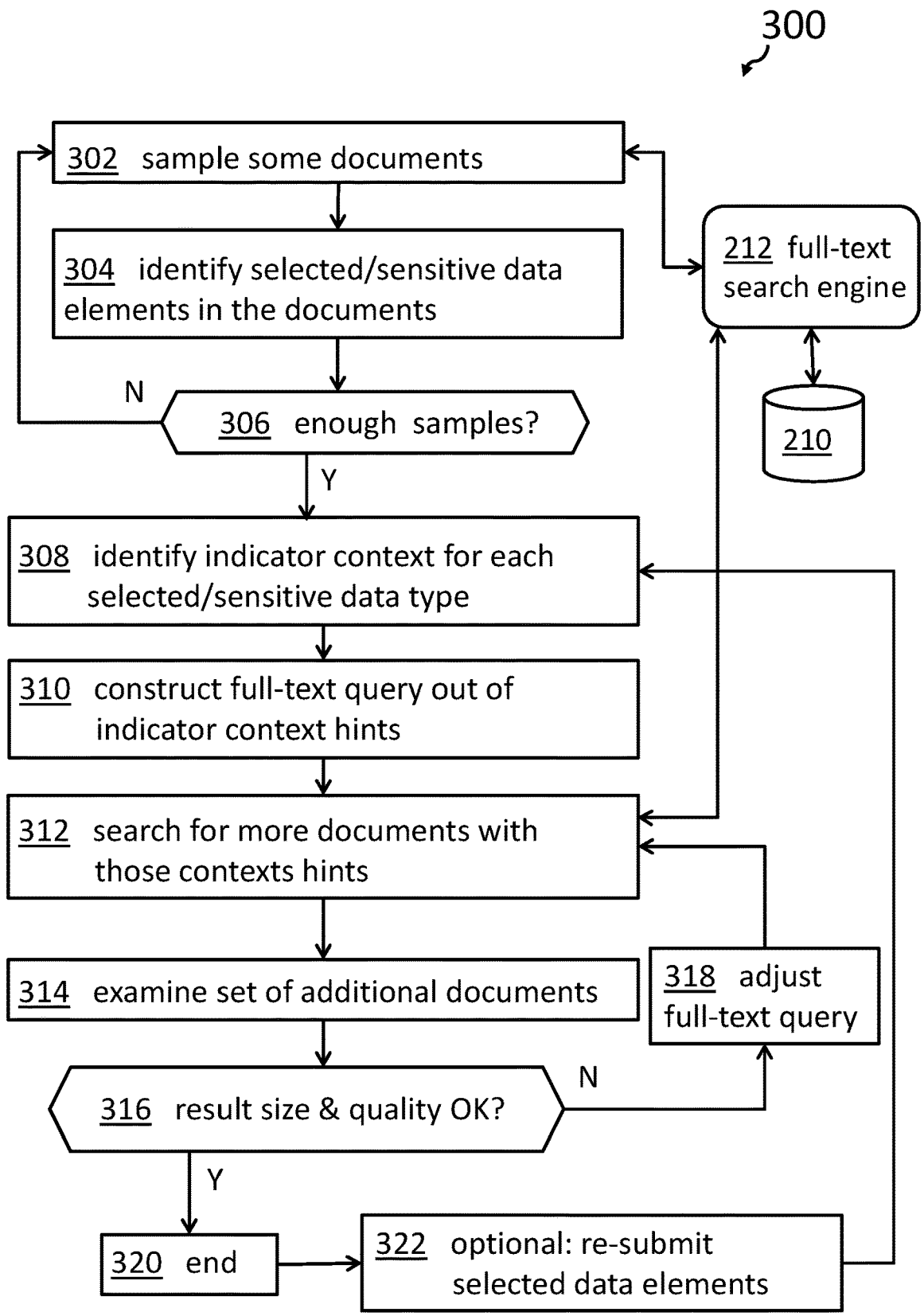

FIG. 3 shows a block diagram of a more implementation-near embodiment of the present invention.

Figure 4:
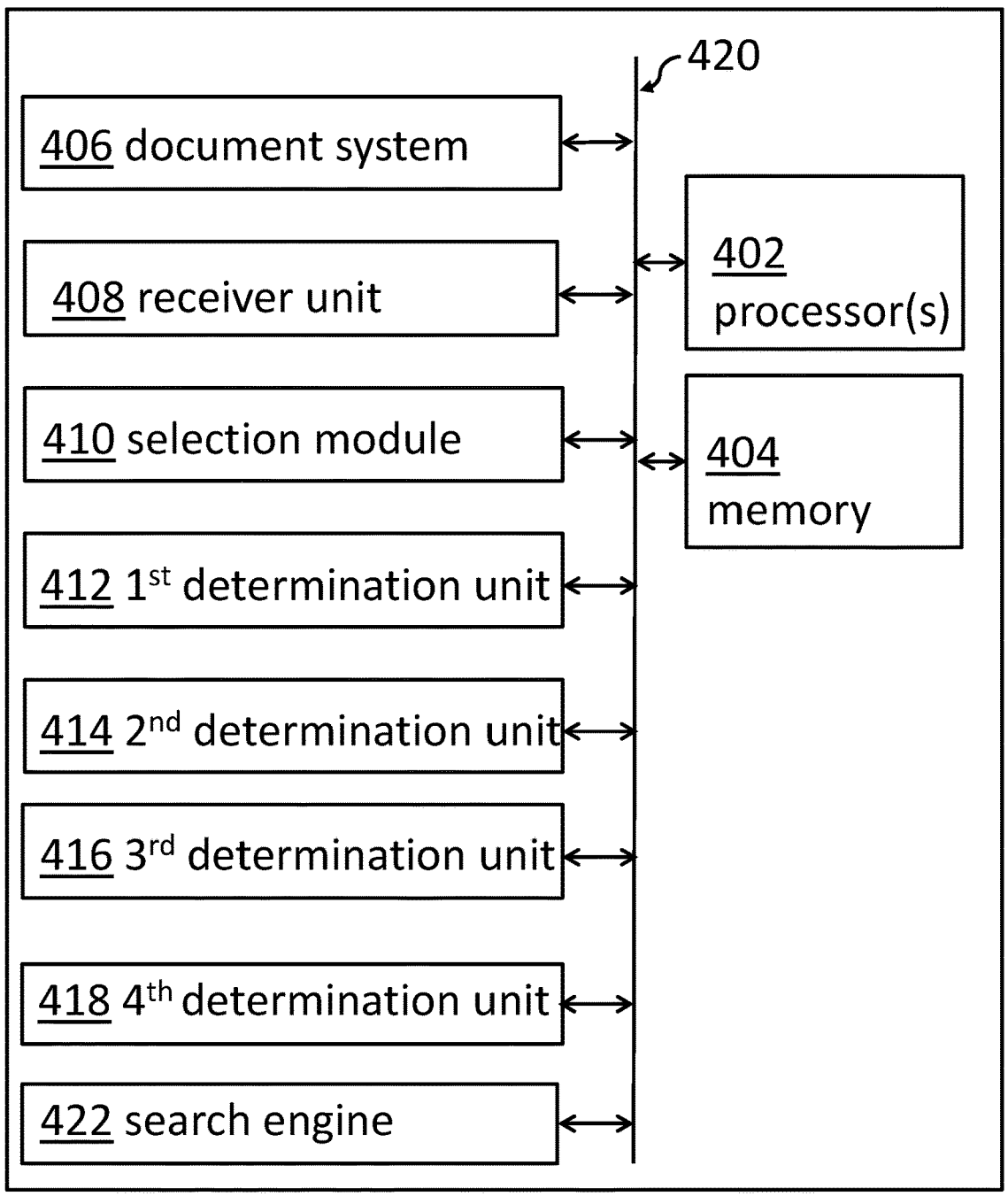

FIG. 4 shows a block diagram of an embodiment of the inventive computer-implemented document analysis system for optimizing unstructured document analysis.

Figure 5:
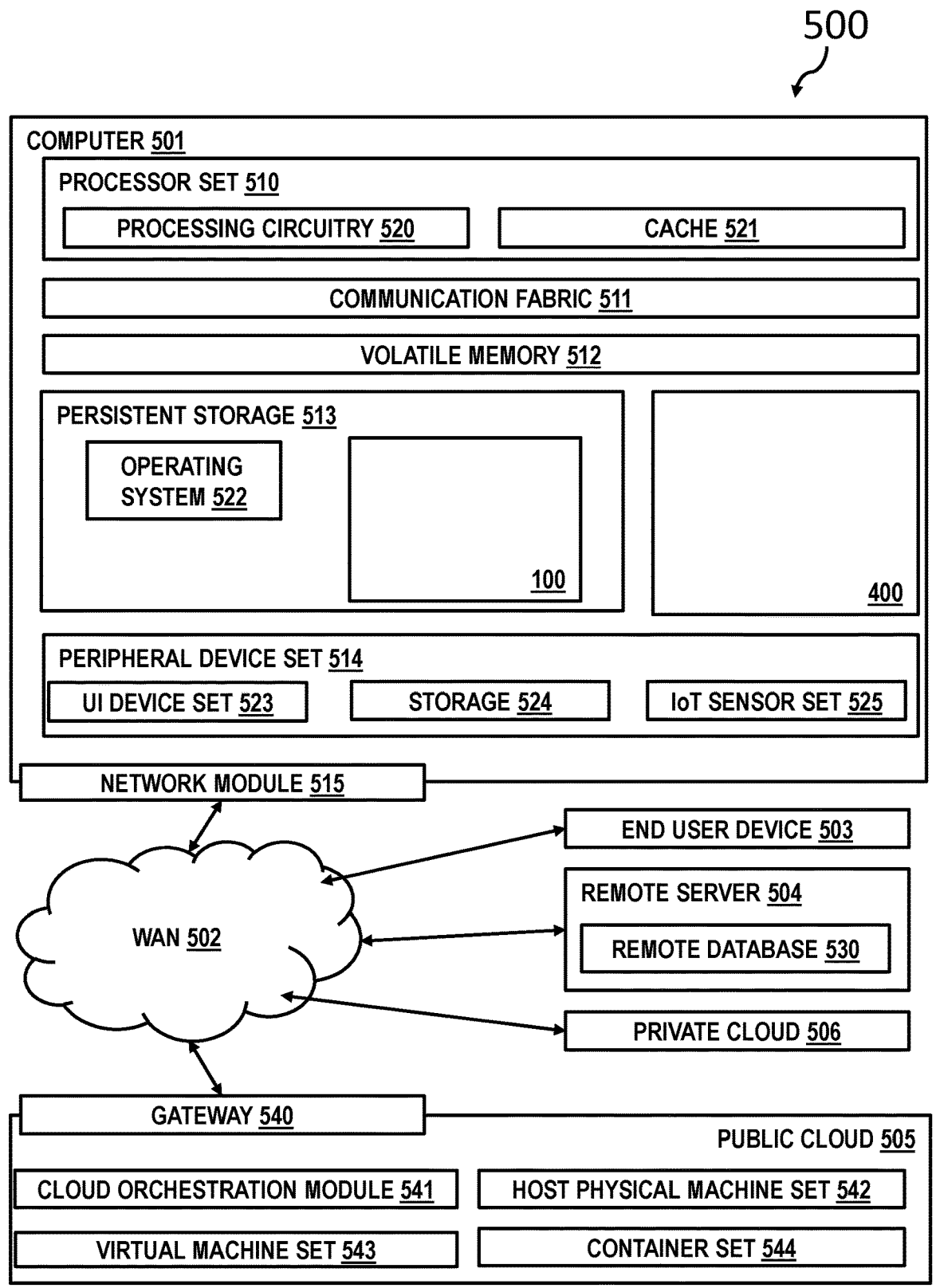

FIG. 5 shows an embodiment of a computing system and/or computing environment comprising the system according to FIG. 4.

DETAILED DESCRIPTION

In the context of this description, the following technical conventions, terms and/or expressions may be used:

The term 'unstructured document analysis' denotes an analysis of electronically stored and available documents with respect to predefined and/or selected or predefined data elements or tokens. The analysis searches for expressions in the unstructured documents that are not searchable in a straightforward and easy way with a classical search engine or a standard SQL statement (SQL=structured query language). Hence, more sophisticated analysis methods are needed to be applied.

The term 'unstructured document' denotes electronically available data storing a series of expressions or tokens separated by delimiters like spaces, commas, semicolons, colons or other predefined strings or characters. Typically, files storing human understandable texts is denoted as unstructured documents. Because of the grammatical and other logical elements and/or context, such documents are also denoted as semi-structured documents. In some cases, an unstructured document is also denoted as an electronic file comprising unstructured content in the sense that it is not stored like data elements in columns and tables, as, e.g., in relational databases.

The term 'document system' denotes a storage system for electronic files that may represent documents. A document system is implemented in the form of a content management system, a document management system, a database or any other mechanism of storing electronic files, like those from an office system or any other editorial system. The documents are stored in any available and documented format.

The term 'full-text index' denotes a data structure storing expressions and their relative positions in a document, in particular a text document. The full-text index is stored in a fast accessible form, e.g., a relational database.

The term 'selected data element' denotes a predefined expression of token belonging to a certain category or type of data, e.g., data relating to private information of people. Such data is also denoted as sensitive data in the sense of data privacy. Different types of data elements are used, like, customer number, a person's name, personal health information, a telephone number together with the person's name, and email address, a driver's license number, a Social Security number, and many more.

The term 'sample' denotes, in the context of this document, a predefined but comparably small number of documents of a larger document repository. The number of documents in the sample is significantly smaller than the number of documents in the document repository (e.g., 1:10, 1:100, 1:1000), e.g., in the range of one per mille. However, and depending on the circumstances, other percentages may be used.

The term 'indicator context expression' denotes a token or word in an unstructured document in the direct or wider surrounding of the selected data element. It may, e.g., be the word just before—i.e., left to—an identified or selected data element, or just after, i.e., right to the identified selected data element.

The term 'relevant sample document' denotes those files that were identified as storing selected data elements or sensitive data.

The term 'full analysis' denotes an analysis of a document under the special task to identify predefined, selected data elements or data of a certain type or sensitive data in general. For this, known technologies may be used.

The term 'predefined boundary' denotes an upper and a lower limit for the number or the percentage of documents in respect to the complete document repository.

The term 'trained machine-learning model' denotes a data structure to be used by a machine-learning system. The trained machine learning model was developed using training data for the machine learning system.

The term 'association model' allows predicting which items or tokens or words are most likely to appear to gather in a document and predict the strength of the relationship between them. In a broader context, association rules also associate a particular conclusion (the purchase of a particular product, for example) with a set of conditions (e.g., the purchase of several other products).

The term 'cloud computing'—and equivalently the more specific term 'cloud computing environment'—are in this context interpreted as a model for enabling convenient, on-demand network access to a shared pool of configurable computing resources (e.g., networks, servers, storage, applications, and services, i.e., collectively denoting execution environments) that can be rapidly provisioned and released with minimal management effort or service provider interaction.

In the following, a detailed description of the figures will be given. All instructions in the figures are schematic. Firstly, a block diagram of an embodiment of the inventive method for optimizing unstructured document analysis is given. Afterwards, further embodiments, as well as embodiments of the computer-implemented document analysis system for optimizing unstructured document analysis will be described.

FIG. 1 shows a block diagram of a preferred embodiment of the method 100 for optimizing unstructured document analysis. The method comprises operating, 102, a document system—e.g., a document or content management system or similar—wherein the document system comprises a plurality of documents—e.g., 1 million or more—comprising unstructured content, e.g. in the form of texts, forms, in PDF (portable document format), docx, HTML, XML, and the like. Furthermore, the document system comprises an associated full-text index that indicates where a phrase can be found in a document in the document system. Each of the documents typically comprises a plurality of data element types.

The method 100 also comprises receiving, 104, a request to identify documents comprising a type of data elements. Such data elements can be predefined, numerical, pattern based or other non-"word"-based expressions. However, also pure alphabetic expressions—i.e., data elements—may be denoted as selected data elements. The data elements may in particular be those related to privacy regulations like GDPR. As an example, a telephone number as such may not be denoted as sensitive data. However, if a name is also stored in relation to the telephone number, the relationship between the two terms (i.e., telephone number and person's name) can be established and may be denoted as being sensitive in the sense of privacy rules.

The method 100 may also comprise selecting, 106, a sample—i.e., a subset—out of the plurality of the documents. This may be performed randomly or manually or based on another predefined algorithm.

Additionally, the method 100 may also comprise determining, 108, all data elements of the type in the sample of the documents. Primarily, the data elements may be of numerical character, however, as another example, also street names or city names or names in general may count as a type. In a broader sense, any expressions that may not be retrievable through a simple search engine command may be denoted as a type of a selected data element.

Moreover, the method 100 may also comprise determining, 110, an indicator context expression for the type of data elements. As an example, if the data element is a number or an alpha-numeric expression, e.g., left to the expression another expression may be found and this may, e.g., be "INS-Nor" or "Insurance-#" or "I-num" or comparable. Thus, a result of the analysis which identified an alpha-numeric expression as being an insurance number, also unveils the above mentioned abbreviations as useful indicator content expressions usable for a further or additional search expression. With this, an example of an identified insurance number has laid the basis for a broader search expression in the sense of e.g., "INS-Nor" or "Insurance-#" or "I-num". The simple example may also be transferred to account numbers/account indicator content expression, social security number/social security number indicator content expression, driver license number/driver license number indicator content expression, and so on.

In addition, the method 100 comprises determining, 112, a query for searching—using a search engine which can be a conventional search engine—the full-text index using the indicator context expressions, and determining, 114, all documents in the document system being compliant to the query, determined in step 112. Thus, the method 100 has achieved its goal by starting with an analysis of a small number of documents, building a query for the complete document repository, and performing a full analysis on a much smaller set of documents in order to save time and computational resources.

FIG. 2 shows a sort of architecture block diagram 200 of an embodiment of the present invention. The task can be to search the documents and the document repository 202 for sensitive data. This may relate to one or more types of data. In general, a brute-force approach (i.e., fully analyze all documents) to achieve this goal using state-of-the-art technologies would be possible. However, it would consume too much computational resources and would run for too long. Thus, a smarter approach is required. Hence, a small sample of documents 204 is extracted from the document repository 202 and a full analysis 206 for selected data elements (or sensitive data) is executed on the sample documents. Starting from the sensitive data—which has been identified using known technologies—indicator context expressions for these sensitive data are identified or determined and used to define a query 208.

Together with an access to a full-text index 210 of the document repository 202, the query is executed by the full-text search engine 212 in order to return a reduced set of documents 214 if compared to the large amount of documents in the document repository 202. On this reduced set of documents comprising the selected data elements or sensitive data, a full analysis 216 regarding sensitive data (or the selected data elements) can be executed again.

Although this is a probabilistic approach without a guarantee to identify with 100% accuracy all selected data elements (or sensitive data), it may be seen as good enough to be compliant with regulatory and other privacy requirements.

FIG. 3 shows a block diagram of a more implementation-near embodiment 300 of the present invention. This embodiment starts with a sampling-based approach to identify potentially policy violation documents to assess a risk to the operator or owner of the repository. In a subsequence step, the identified entries are analyzed within the documents (e.g., credit card numbers, insurance numbers, social security numbers, driver's license numbers, etc.) with their context and extract information in the form of words (e.g., tokens) that can then be used to search the indexed document corpus—i.e., the document repository—to find similar documents that potentially may have the same violations/findings.

A general point of the present invention is to create a generalized search pattern that finds not only documents with identical violations but also similar documents based on comparable context. So, not only documents are found with the exact same credit card number, but it is also searched at the context surrounding the credit card number. Furthermore, more sophisticated token extraction based on machine-learning concepts and explained functionality and search for this generalized context can be used.

In a first step 302, an existing sampling approach is used to identify a representative, small subset of the large number of documents in the scope. On the sample set, the full analysis is performed, 304. For example, a sensitive data classification used during the analysis may find sensitive data elements—i.e., (selected) data elements—like credit card numbers, dates of birth, health information or other personal/private information. Only the documents that the deep analysis considers relevant/responsive to a business or technical problem at hand are examined further in the next steps. If it turns out that no or only few relevant/responsive documents have been found, a larger sample can automatically be used, 306, case "N".

Next, step 308, a set of full-text searchable indicator contexts is identified for these relevant/responsive documents. For the example of sensitive data classification, this can be the information present to the left or right of the position where the actual data element is found. It could be a form label like "customer number" present in billing PDF documents to the left of where the analysis has identified an actual customer number. It could also be a header that indicates that this is a billing document.

A variety of approaches can be used to identify these full-text searchable indicator contexts: (i) in a single document out of the sample, positional information relative to data elements found by the analysis can be used: left/right contexts, especially ones that indicate form label's with delimiters like: comma, semicolon or types, formats and hints like capitalization of formatting and structural hints, like, indentation, bold formatting and table structure that indicate labels; (ii) when all documents in the sample are compared, the above explained strategy can be refined further: indicators from different documents can be compared to find ones that occur in several documents; fuzzy matching and machine-learning approaches can be used to generalize which indicators are most promising to use; and (iii) one additional possible technique would be to use an association model (ex-apriori algorithm) in order to detect strong patterns like "if token is sensitive then left token is X with 75% confidence" and analyze the resulting patterns to identify that X is a searchable token that can be found in other documents.

In a next step, once a first set of promising full-text searchable indicators have been identified, the pre-existing full-text index 210 is used via the full-text search engine 212 to search for more candidates that share these indicators with the responsive/relevant documents from the sample set. Since the full-text index 210 is already available, which can be searched efficiently, this does not incur a noticeable amount of effort or resources.

The indicator context identified in the previous step can be used—steps 310, 312—in full-text queries in various ways: (i) phrase queries requiring all words in the indicator context to occur next to each other (e.g., searching for the phrase "customer number"); (ii) proximity queries requiring the words to occur within a given window (e.g., search for "customer" WITHIN N WORDS OF "number"); and (iii) multiple indicator contexts can be combined using AND, OR or M OUT OF N queries.

Because typically only a very small subset of the large total amount of documents—in particular the complete document repository—is returned by the indicator search. In this step, a further checking and optimization/refinement can be done: (i) if the result set is too large, the indicator query from the previous step can be refined to be more restrictive; e.g., by converting OR to AND and decreasing proximity threshold value; (ii) if the result set is too small, the indicator query from the previous step can be refined to be less restrictive, e.g., by converting AND to OR and increasing proximity threshold values.

Then—step 314—the documents in the search result lists are run through the same analysis as the original representative sample in the first step. This will likely identify a large percentage of documents in the result set as relevant/responsive.

In the simplest case, the process may stop here, 320, if a determination regarding the result size and the result quality is positive, case "Y", 316. However, it is also possible to enter a refinement loop, 318, case "N" at 316. For the documents newly identified as relevance less responsive, it is now also possible to determine the full-text searchable indicators. These new indicators can be compared to all indicators found so far and previous parses through this refinement loop. Generalization and machine-learning techniques can be used to further tune or optimize the set of indicators and to re-issue the search with a generalized set of indicators, 322.

Optional refinements to embodiment 300 are also possible. For example, every time a document is analyzed (resulting from the previous search step), the model (patterns or whatever allows to find the relevant tokens being strong indicators of sensitive tokens) are recomputed/re-determined. Re-computing the model of the new documents that are analyzed gives the feedback loop allowing the system to remove patterns that have been found at the beginning as being relevant but may appear over time to be rather irrelevant. Once the model is in memory, it allows for the prediction that a document is sensitive when some tokens are found, and automatically triggers a deeper analysis during the document's initial index once those specified tokens are recognized.

Another option may be in the use of a trained machine-learning model for documents with a specific indicator similar to a training using documents to identify indicator types. For the resulting machine-learning model, the explained functionality can be used to extract the most contributing tokens that have to occur, and those tokens that must not be present (the document set for "must not be present" are documents that have been analyzed but that did not show up any indicator). This extracted set of tokens can be used to refine the search for new documents that potentially comprise those indicators as well.

At the end, most or at least many documents that are relevant/responsive will be identified even though only a very small subset of the overall documents that has been fully analyzed. However, the process is heuristic in nature and there is a chance that some responsive/relevant documents may still exist and be recognized throughout the document set (i.e., the document repository). An approach like a usual and sampling can be used to efficiently test for that case. Worst case, it may be required to run a full analysis; in contrast the proposed approach will make sure that a large amount of the relevant documents can be identified much earlier and with much less computational effort.

FIG. 4 shows a block diagram of an embodiment 400 of the computer-implemented document analysis system for optimizing unstructured document analysis. The system comprises a processor 402 and a memory 404 operatively coupled to the processor 402, wherein the memory 404 stores program code portions, which, when executed enable the processor 402 to operate a document system 406. Thereby, the document system 406 comprises a plurality of documents comprising unstructured content and a related full-text index. The content of the documents of the document system relate typically to a plurality of different data element types.

The processor 402 is also enabled to receive—in particular by a receiver unit 408—a request to identify documents comprising a type of data elements, i.e., out of the plurality of data elements of different types. The type of the data elements can be predefined, e.g., by received user input.

The processor 402 is also enabled to select—in particular, by a selection module 410—a sample out of the plurality of the documents, and to determine—in particular, by a first determination unit 412—all data elements of the type in the sample of the documents.

Furthermore, the processor 402 is also enabled to determine—in particular, by a second determination unit 414—an indicator context expression for the type of data elements of the type, to determine—in particular, by a third determination unit 416—a query for searching—using a search engine 422—the full-text index using the indicator context expression, as well as to determine—in particular, by a fourth determination unit 418—all documents in the document system being compliant to the determined query.

It shall also be mentioned that all functional units, modules and functional blocks may be communicatively coupled to each other for signal or message exchange in a selected 1:1 manner. Alternatively the functional units, modules and functional blocks—in particular, the processor 402, the memory 404, the document system 406, the receiver unit 408, the selection module 410, the first determination unit 412, the second determination unit 414, the third determination unit 416 and the fourth determination unit 418—can be linked to a system internal bus system 420 for a selective signal or message exchange.

Embodiments of the invention may be implemented together with virtually any type of computer, regardless of the platform being suitable for storing and/or executing program code. FIG. 5 shows, as an example, a computing system and/or computing environment 500 suitable for executing program code related to the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code involved in performing the inventive methods, such as the method 100 for optimizing unstructured document analysis.

In addition to block 550, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 550, as identified above), peripheral device set 514 (including user interface (UI), device set 523, storage 524, and Internet of Things (IOT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 550 in persistent storage 513.

COMMUNICATION FABRIC 511 is the signal conduction paths that allow the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface type operating systems that employ a kernel. The code included in block 550 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

It should also be mentioned that the computer-implemented document analysis system for optimizing unstructured document analysis 400 can be an operational subsystem of the computer 501 and may be attached to a computer-internal bus system.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware—based systems that perform the specified functions or act or carry out combinations of special purpose hardware and computer instructions.

The terminology used herein is for the purpose of describing particular embodiments only and is not intended to limit the invention. As used herein, the singular forms a, an and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for optimizing unstructured document analysis, said method comprising:

operating a document system, said document system comprising a plurality of documents comprising unstructured content and a full-text index;

receiving a request to identify documents comprising a type of data elements;

selecting a sample out of said plurality of documents, wherein selecting the sample comprises an existing sampling approach to identify a representative, small subset of the large number of documents in a scope of the request;

determining data elements of said type in said sample of said plurality of documents;

determining an indicator context expression for said type of data elements out of the determined data elements of said type;

determining a query for searching, using a search engine, said full-text index using said indicator context expression; and determining the documents in said document system being compliant to said query.

2. The method according to claim 1, wherein a number of documents in said sample is at least 10 times smaller than a second number of documents in said document system.

3. The method according to claim 1, wherein said determining the data elements of said type in said sample comprises:

determining a number of relevant sample documents in said sample; and upon determining that said number of relevant sample documents is below a predefined sample threshold value, selecting a larger sample out of said plurality of documents.

4. The method according to claim 1, wherein said determining the documents in said document system being compliant to said query comprises:

applying a full analysis related to the documents in said document system.

5. The method according to claim 1, further comprising:

determining a result number of the documents being compliant with said query; and upon said result number being determined to be equal or outside predefined boundaries, adjusting said query and repeating said determining the documents in said document system being compliant to said query.

6. The method according to claim 5, further comprising:

upon said result number having a value within predefined boundaries and a quality indicator value being larger than a predefined quality indicator threshold value, wherein said quality indicator value being indicative of a quality criterion of said type of data elements, stopping the repeating.

7. The method according to claim 1, further comprising:

repeating said steps of:
  determining indicator context expressions,
  determining the query for searching said full-text index, and
  determining the documents in said document system being compliant to said query, thereby redefining a scope of said indicator context expression.

8. The method according to claim 1, wherein said determining said indicator context expression comprises:

selecting an expression to a left of a determined data element as one indicator context expression; and selecting another expression to a right of said determined data element as another indicator context expression.

9. The method according to claim 1, wherein determining said indicator context expression comprises:

selecting an expression as said indicator context expression in a surrounding of a determined data element, wherein said expression has another format than other elements in said surrounding of said determined data element.

10. The method according to claim 1, wherein determining said indicator context expression comprises:
using a trained machine-learning model that has been trained to determine said indicator context expression for a determined data element in a given document, wherein said machine-learning model has been developed by a training of a machine-learning system with documents with labelled selected data elements and related indicator context expressions.

11. The method according to claim 1, wherein determining said indicator context expressions comprises:
using an association model adapted for detecting strong relationship patterns between a determined data element and a potential indicator context expression; and
confirming said potential indicator context expression as an actual indicator context expression based on an analysis of other documents comprising said relationship of said potential indicator context expression and said determined data element.

12. A computer-implemented document analysis system for optimizing unstructured document analysis, said system comprising:
a processor and a memory operatively coupled to said processor, wherein said memory stored program code portions, which, when executed enable said processor to:
operate a document system, said document system comprising a plurality of documents comprising unstructured content and a full-text index;
receive a request to identify documents comprising a type of data elements;
select a sample out of said plurality of documents, wherein selecting the sample comprises an existing sampling approach to identify a representative, small subset of the large number of documents in a scope of the request;
determine data elements of said type in said sample of said plurality of documents;
determine an indicator context expression for said type of data elements out of the determined data elements of said type;
determine a query for searching, using a search engine, said full-text index using said indicator context expression; and
determine the documents in said document system being compliant to said query.

13. The system of claim 12, wherein a number of documents in said sample is at least ten times smaller than a second number of documents in said document system.

14. The system of claim 12, wherein, during said determining said data elements of said type in said sample of documents, said processor is also adapted to:
determine a number of relevant sample documents in said sample; and
upon determining that said number of relevant sample documents is below a predefined sample threshold value, selecting a larger sample out of said plurality of documents.

15. The system of claim 12, wherein during said determining the documents in said document system, said processor is also adapted to:
apply a full analysis system related to said document system.

16. The system of claim 12, wherein said processor is also adapted to:
determine a result number of the documents being compliant with said query; and
upon a determination that said result number is equal or outside predefined boundaries, adjust said query and execute a repetition of said determining the documents in said document system being compliant to said query.

17. The system according to claim 16, wherein said processor, upon said result number having a value within predefined boundaries, is also adapted to:
upon a quality indicator value being larger than a predefined quality indicator threshold value, wherein said quality indicator value being indicative of a quality criterion of said type of determined data element, stop said repetition.

18. The system according to claim 12, wherein said processor is also adapted to:
repeat said determining indicator context expressions, said determining said query for searching said full-text index, and said determining the documents in said document system being compliant to said query, thereby redefining a scope of said indicator context expressions.

19. The system according to claim 12, wherein said processor, during said determining said indicator context expression, is also adapted to:
select an expression to a left of a determined data element as one indicator context expression; and
select another expression to a right of said determined data element as another indicator context expression.

20. A computer program product for optimizing unstructured document analysis, said computer program product comprising a computer readable storage medium having program instructions embodied therewith, said program instructions being executable by one or more computing systems or controllers to cause said one or more computing systems to:
operate a document system, said document system comprising a plurality of documents comprising unstructured content and a full-text index;
receive, a request to identify documents comprising a type of data elements;
select a sample out of said plurality of documents, wherein selecting the sample comprises an existing sampling approach to identify a representative, small subset of the large number of documents in a scope of the request;
determine data elements of said type in said sample of documents;
determine an indicator context expression for said type of data elements out of the determined data elements of said type;
determine a query for searching, using a search engine, said full-text index using said indicator context expression; and
determine the documents in said document system being compliant to said query.

* * * * *